US005728427A

United States Patent [19]

Akkerman et al.

[11] Patent Number: 5,728,427

[45] Date of Patent: Mar. 17, 1998

[54] PROCESS FOR PRODUCING COLOR CARDS

[75] Inventors: Matthias Anthonie Johannes Akkerman, Driebergen; Gerhardus Johannis Mulder, Odijk, both of Netherlands

[73] Assignee: Fina Research, S.A., Feluy, Belgium

[21] Appl. No.: 454,359

[22] PCT Filed: Nov. 22, 1994

[86] PCT No.: PCT/BE94/00089

§ 371 Date: Dec. 14, 1995

§ 102(e) Date: Dec. 14, 1995

[87] PCT Pub. No.: WO95/14577

PCT Pub. Date: Jun. 1, 1995

[30] Foreign Application Priority Data

Nov. 22, 1993 [NL] Netherlands .......................... 93870225

[51] Int. Cl.$^6$ .............................. B29C 71/02; B05D 3/04; B05D 3/06; B05D 5/00

[52] U.S. Cl. .......................... 427/288; 427/286; 427/378; 427/382; 427/493; 427/510; 427/542

[58] Field of Search .................................... 427/280, 382, 427/288, 510, 493, 542, 544, 285, 286, 378

[56] References Cited

U.S. PATENT DOCUMENTS

| | | | |
|---|---|---|---|
| 2,321,938 | 6/1943 | Quinn . | |
| 3,565,039 | 2/1971 | Remer | 118/325 |
| 3,632,382 | 1/1972 | Reed et al. | 427/282 |
| 3,850,671 | 11/1974 | Petty et al. . | |
| 3,967,009 | 6/1976 | Blake | 427/288 |
| 4,264,656 | 4/1981 | Reeder | 427/385.5 |
| 4,336,279 | 6/1982 | Metzger | 427/382 |
| 4,379,696 | 4/1983 | Lerner | 434/98 |
| 4,594,266 | 6/1986 | Lemaire et al. | 427/542 |
| 4,613,633 | 9/1986 | Sekiya et al. | 427/391 |
| 4,652,482 | 3/1987 | Diesel et al. | 427/288 |
| 5,032,424 | 7/1991 | Carlson et al. | 427/542 |
| 5,045,342 | 9/1991 | Boissevain et al. | 427/361 |
| 5,338,361 | 8/1994 | Anderson et al. | 118/413 |
| 5,407,995 | 4/1995 | Hintze-Bruning | 427/393 |
| 5,468,542 | 11/1995 | Crouch | 427/510 |

FOREIGN PATENT DOCUMENTS 883712 2/1943 France .

OTHER PUBLICATIONS

Erik W. Stephansen, New high–intensity infrared radiation reduces binder migration on coating, 1986, pp. 42–44, Tappi Journal Feb.

S. Knoedler, Possibilities and limits of water colors in packaging printing, Jul. 20,1981, p. 634, Chemical Abstracts, vol. 95, No. 3.

*Primary Examiner*—Diana Dudash

*Attorney, Agent, or Firm*—Michael J. Caddell; M. Norwood Cheairs

[57] ABSTRACT

Wet color cards prepared with water-based emulsion paints applied in layers of at least 75 g/m$^2$ are dried using infra-red dryers irradiating the uncoated side of the cardboard or paper cards.

8 Claims, No Drawings

PROCESS FOR PRODUCING COLOR CARDS

The invention relates to a process for producing colour cards. More particularly, it relates to a process for producing colour cards with water-based lacquers.

Colour cards are well known in the paint business. They generally consist of sheets of cardboard or of paper, on which samples of the various paint colours are applied (often in the form of small rectangles arranged according to a geometrical pattern).

The easiest but most time-consuming process is to apply each colour on a large piece of cardboard or of paper which is then cut into small pieces, one of which is attached on each colour card.

It has long been preferred to use whenever possible a process for applying several colours simultaneously, three of which are currently used:

a. spraying, using usual spray techniques (e.g. airless): by using several spraying-guns, each filled with a different colour, one can apply several colours in one passage;

b. printing: using a printing plate, many colours can be applied simultaneously on a sheet;

c. roller application: several colours are applied side by side on a roll of paper in a continuous process.

Mainly one type of paint is used for producing colour cards, namely nitrocellulose paint (even for colour cards relating to other types of paints). The nitrocellulose used as binder is dissolved in volatile solvents, in order to ensure quick drying of the paint film under (heated) air flow. For example, roller application can be used with a paper speed of up to about 35 m/min without problem as to drying speed.

Worldwide concern for the environment has now led to a desire for reducing the emission of volatile organic compounds. There is thus a need in the art for colour card lacquers causing the emission of less or no volatile organic compounds, and the Applicants have now developed a water-based emulsion paint suitable for this application. However, the drying of water-based is too slow (in the above example, not more than about 6 m/min), even when using warm-air drying.

It is thus an object of this invention to provide a process for producing colour cards with water-based lacquers at increased rate of production.

Another object of the invention is to provide a process for increasing the drying speed of colour cards prepared with water-based lacquers.

Yet another object of the invention is to provide a process for uniformly drying areas of different colours on colour cards prepared with water-based lacquers.

Still another object of the invention is to provide for the use of water-based lacquer compositions for producing colour cards using cardboard or paper substrates.

U.S. Pat. No. 2,321,938A discloses a coating process wherein a fibrous product coated on one side (or on both sides) is conveyed into a drier comprising one bank of infra-red lamps facing the coated surface (or two banks located respectively above and beneath said product).

FR-883712-A discloses a printing process wherein infrared rays and air blowing are used in such a way as to act both on the printed side of the substrate. In the introduction, there is acknowledged as prior art a process for drying a printed transparent surface by heating the reverse face thereof using infra-red rays.

In accordance with the invention, there is provided a process for producing colour cards with lacquers comprising the steps of:

providing a cardboard or paper substrate;

applying simultaneously at least two different colours of a lacquer on one side of said substrate; and drying said lacquer;

characterised in that (i) said lacquer is a water-based emulsion paint;

(ii) said lacquer is applied in layers of at least 75 $g/m^2$; and (ii) said drying step is essentially carried out using infra-red dryers irradiating the uncoated side of said substrate.

There is also provided a process for drying colour cards prepared with water-based emulsion paints applied in layers of at least 75 $g/m^2$, comprising using infra-red dryers to irradiate the uncoated side of the cards.

The invention further provides for the use of infra-red dryers to dry wet colour cards prepared with water-based emulsion paints in layers of at least 75 $g/m^2$ by irradiation of the uncoated side of the cards.

The cardboard or paper substrate to be used in the process of the invention is known in the art and need not be described here; it is normally white. Glossy paper, as used in the graphic industry is preferred. As examples of substrates that can be used, one can cite Bristol board, Chromolux paper, Invercoat paper, Machine coated paper and Writing paper. The thickness of the paper should be sufficient as to prevent any background colour to appear through the paper thus distorting the colours and/or the white background; thicknesses of 170 to 300 $g/m^2$ have been found appropriate, although thicknesses up to 400 $g/m^2$ are acceptable.

The lacquer should be applied in layers of at least 75 $g/m^2$ (wet layer thickness), preferably about 100 $g/m^2$, in order to have the sufficient hiding power which is required for colour cards. The maximum layer thickness depends on the application technique; it is usually of not more than 175 $g/m^2$, preferably not more than 150 $g/m^2$.

The simultaneous application of several colours of a lacquer on the substrate can be made by any process, including the ones currently used in the art and hereabove described. Simultaneously as used herein means that a colour patch is applied while another is not yet dry, even though they may actually be applied consecutively.

Lacquers, as used herein, are paints which dry primarily by solvent evaporation. As lacquer, there is used in the process of the invention a water-based (i.e. a water-based emulsion) lacquer. The preferred emulsion paints are essentially based on one or more acrylic binders (preferably anionic-modified acrylics) optionally copolymerised with styrene and/or in admixture with styrene-acrylic binders (preferably anionic-modified styrene-acrylics). While colour cards for wide distribution to private users (i.e. in the "do-it-yourself" segment of the market) can indeed be made with about any conventional water-based lacquer, colour cards for use by professional users must have colour patches that have sufficient mechanical properties, particularly as to hardness and abrasion resistance. The selection of monomers in function of the properties to which they contribute in the final film is known in the art and need not be described here (for acrylics and styrene, see e.g. Chapter 17 in "Surface Coatings" vol. I, OCCA, 2nd edition, Chapman & Hall, London, 1983, or at pages 19–20 in "Surface Coatings-2", A. D. Wilson et al, ed., Elsevier, 1988). The preparation of water-based emulsions is also well-known in the art and does not need either to be described here (for a general discussion, see e.g. Chapter 1 in "Surface Coatings-2", op. cit.). Although water-based emulsion paints are known as such, their use to produce colour cards using paper or cardboard substrates has not yet been described. Indeed, there was a prejudice in the art against said use, because those skilled in the art thought that paper or cardboard would crumple because of the water base.

Infra-red dryers as such are known. The core element is generally one or more quartz lamp, comprising a tungsten filament in a quartz bulb filled with an inert gas; the filament is heated by an electric current, and about 90% of the electrical energy is emitted as infra-red (IR). Reflectors are preferably used to concentrate the IR on the product to be dried.

IR drying has already been used for bodywork in the automobile industry. It has also been used in the printing industry. However, in both cases the IR dryers are facing the coated side of the substrate, i.e. they heat respectively the paint or the ink.

The Applicants have however observed that IR dryers could not be used according to the prior art in order to dry colour cards, because each colour has a different absorption behaviour towards the IR radiation. Thus, when IR drying conditions are optimised for dark colours, which most absorb IR, drying of light colours is totally insufficient.

However, the Applicants have now unexpectedly found that by irradiating the uncoated side of the substrate of wet colour cards prepared with water-based lacquers, uniform drying of all colours could be obtained at an increased rate.

The preferred IR dryers use IR-A lamps, i.e. those having peak intensity between about 760 and 1400 nm. The lamps are preferably placed closer to the substrate than as presently used in the printing industry (e.g. about 10 to 15 cm instead of about 25 cm) because white paper absorbs less heat from IR rays than printing ink.

In the process of the invention, drying of light and dark colours is about equal, and high drying rates can be reached with water-based emulsion paints.

The process of the invention can be practiced continuously or in batch. It can be combined with air flow drying, simultaneously or not with the IR drying.

The invention will now be illustrated by the following examples.

EXAMPLE 1

White paint was prepared which had the following composition (expressed in parts by weight, pbw):

| | |
|---|---|
| titanium dioxide | 21.3 |
| fillers & extenders | 0.3 |
| acrylic resin | 25.4 (= 51.8 pbw of 49% emulsion in water) |
| styrene-acrylic resin | 5.8 (= 12.9 pbw of 45% emulsion in water) |
| additives | 2.0 |
| glycols | 4.2 |
| water | 41.0 |

Black paint was prepared which had the following composition (expressed in parts by weight):

| | |
|---|---|
| carbon black | 5.9 |
| fillers & extenders | 0.2 |
| acrylic resin | 29.6 (= 60.4 pbw of 49% emulsion in water) |
| styrene-acrylic resin | 6.8 (= 15.1 pbw of 45% emulsion in water) |
| additives | 3.1 |
| glycols | 4.8 |
| water | 49.6 |

One side of a sheet of white glossy paper (Chromolux, 250 g/m$^2$) was coated at one place with the white paint and at another place with the black paint, in both cases in a layer of about 0.1 mm wet thickness using a BA30 applicator.

An infra-red A dryer (IMR-020-6 module from PHILIPS Lighting, having a peak intensity at about 1100 nm) was placed at 12 cm from the sheet, facing the uncoated side thereof and at equal distance from the black and white spots.

IR heating was applied firstly at high energy (20 A, 150 V) during 10 seconds then at medium energy (15.7 A, 100 V) during 50 seconds.

Temperature measurements showed that the temperature rose slightly above 90° C. after 10 s (white=92° C., black=94° C.) then fell slightly below 90° C. (white=88° C., black=86° C.) before raising again above 120° C. (white=124° C., black=126° C.). Since the temperatures reached can be considered to be identical for practical purposes, this example shows that uniform drying can be achieved with colour cards.

COMPARATIVE EXAMPLES A AND B

The experiment of example 1 was repeated with the following modifications:

wet thickness of about 0.16 mm obtained with a BA45 applicator;

distance from dryer to sheet: 25 cm

IR dryer heating the coated side

In comparative example A, the IR dryer was operated at 200 V and 23.5 A. After 25 s, the black paint was already excessively boiling; after 90 s, the white paint began to boil. This example demonstrates the considerable difference in energy uptake by light and dark paint.

In comparative example B, the IR dryer was operated at 100 V and 15.7 A during 4 minutes. While the black paint was already hard, the white paint was still soft. This example demonstrates the inability to obtain satisfactory results by IR irradiation of the coated side of colour cards.

We claim:

1. Process for producing colour cards with lacquers comprising the steps of:

providing a cardboard or paper substrate;

applying simultaneously at least two different colours of a lacquer on one side of said substrate; and drying said lacquer;

characterised in that (i) said lacquer is a water-based emulsion paint;

(ii) said lacquer is applied in layers of at least 75 g/m$^2$; and (iii) said drying step is substantially carried out using infra-red dryers irradiating the uncoated side of said substrate.

2. Process according to claim 1, wherein said emulsion paint is substantially based on acrylic binders.

3. Process according to claim 2, wherein said acrylic binders are copolymerised with styrene or in admixture with styrene-acrylic binders.

4. Process according to claim 1, wherein glossy paper is used as substrate.

5. Process according to claim 1, wherein the infra-red dryers have peak intensity between 760 and 1400 nm.

6. Process according to claim 1, when operated continuously.

7. Process according to any one of claims 1 to 6, when combined with air-flow drying.

8. Process for drying wet colour cards prepared with water-based emulsion paints applied in at least one layer of at least 75 g/m$^2$, comprising using infra-red dryers to irradiate the uncoated side of the cards.

* * * * *